C. B. GARDNER.
CLUTCH OPERATING MECHANISM.
APPLICATION FILED MAY 4, 1914.
1,119,270.
Patented Dec. 1, 1914.
3 SHEETS—SHEET 1.
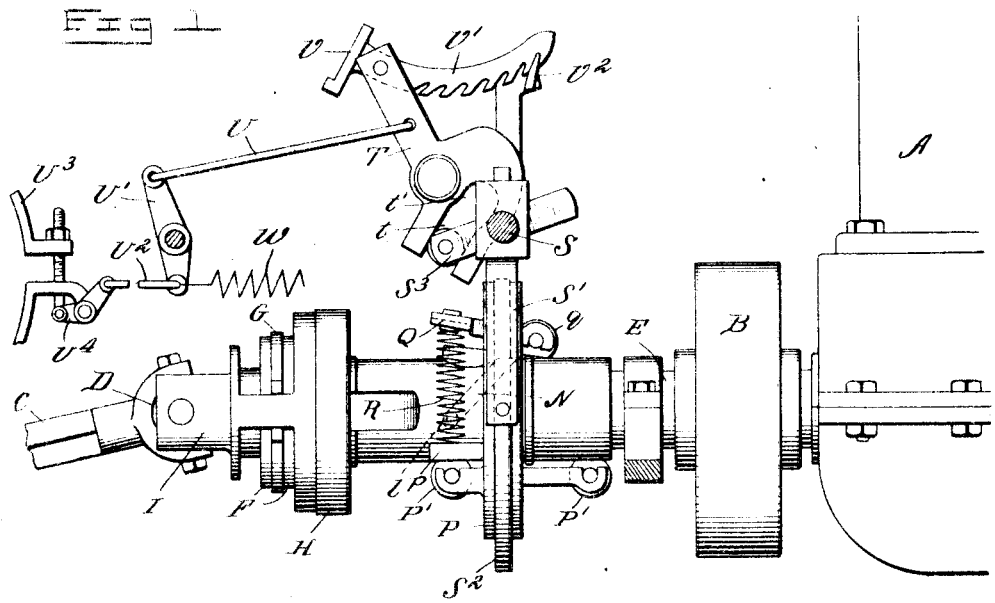
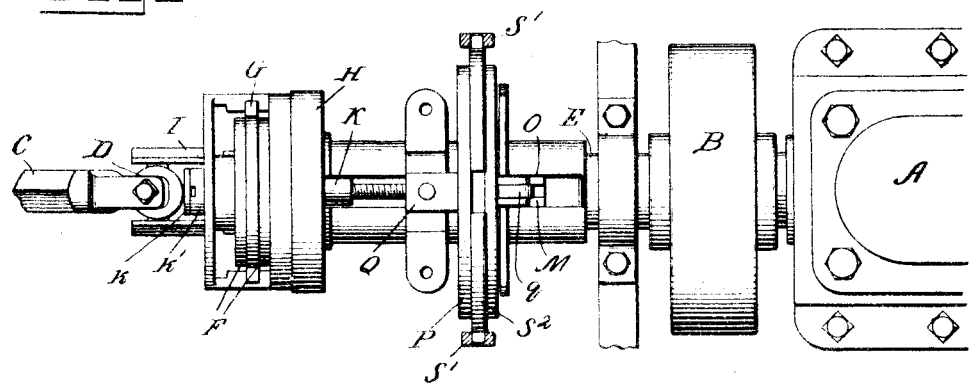
Witnesses
Hubert L. Brown.
Francis E. Ruth.
Inventor
Charles B. Gardner
By Church & Church
his Attorneys

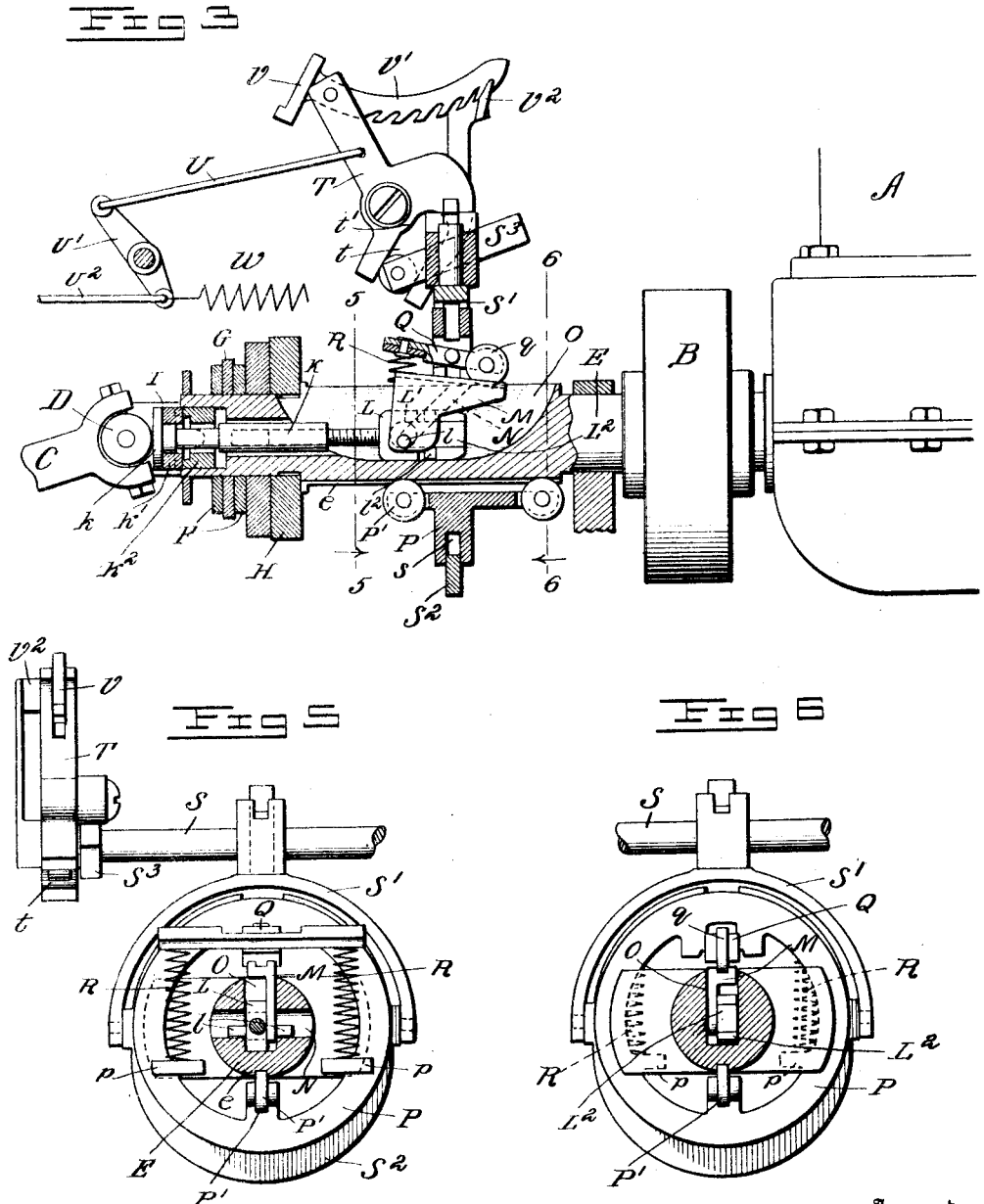

C. B. GARDNER.
CLUTCH OPERATING MECHANISM.
APPLICATION FILED MAY 4, 1914.
1,119,270.
Patented Dec. 1, 1914.
3 SHEETS—SHEET 3.
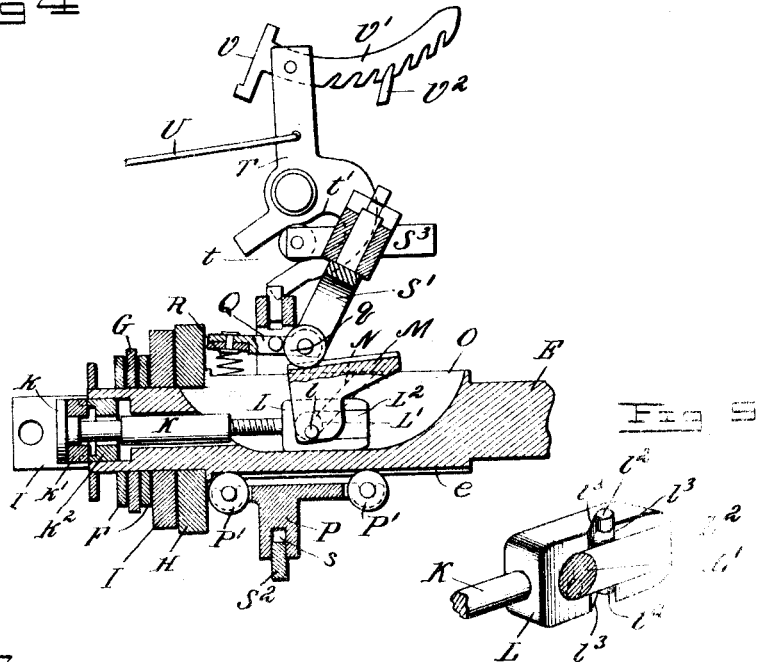
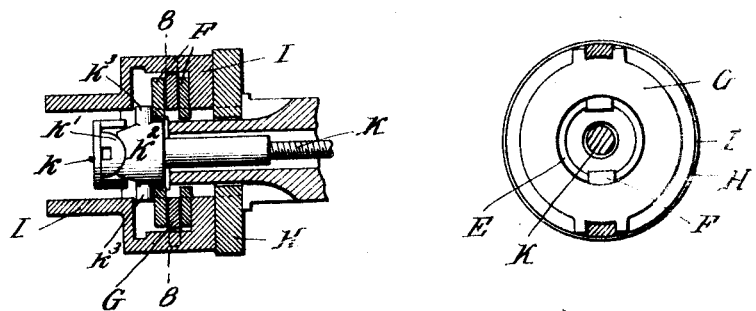

UNITED STATES PATENT OFFICE.

CHARLES B. GARDNER, OF ATLANTA, GEORGIA.

CLUTCH-OPERATING MECHANISM.

1,119,270.  Specification of Letters Patent.  Patented Dec. 1, 1914.

Application filed May 4, 1914. Serial No. 836,207.

*To all whom it may concern:*

Be it known that I, CHARLES B. GARDNER, a citizen of the United States, residing at Atlanta, in the county of Fulton and State of Georgia, have invented certain new and useful Improvements in Clutch-Operating Mechanism; and I do hereby declare the following to be a full, clear, and exact description of the same, reference being had to the accompanying drawings, forming part of this specification, and to the figures and letters of reference marked thereon.

This invention relates to mechanism for operating and controlling friction clutches, more especially disk clutches for connecting a driving and driven part, the invention being particularly applicable for the operation and control of clutches in the driving mechanism of automobiles or self-propelled vehicles.

The principal objects of the invention are to provide a clutch operating mechanism with which the coöperating, driving and driven clutch members may be so accurately and definitely controlled and moved that the static inertia of the driven parts may be overcome so gradually as to prevent the stalling of the motor or the acceleration of the driven parts at such speed as would be harmful or disagreeable.

A further object of the invention is to provide a clutch operating and controlling mechanism with which the leverage of the operating members may be greatly increased without increasing to any material extent the range of movement of the parts which are moved by hand or foot power, with the result that the torque transmitted by the clutch will be greatly increased, without requiring a greater effort on the part of the operator.

A further object of the invention is to provide a clutch operating mechanism in which the connection between the clutch spring and clutch operating lever is movable, whereby the power of the spring may be exerted for putting the clutch in with a graduated pressure or for entirely freeing the clutch members, and the shifting of said connection is controlled by a foot lever, whereby the foot lever is relieved from the pressure of the clutch spring, and may be utilized for setting the brakes without having to overcome the direct pressure of the clutch spring.

With the above objects and others which will hereinafter become apparent in view, the invention consists in certain novel details of construction and combinations and arrangements of parts, all as will be hereinafter described and pointed out particularly in the appended claims.

Referring to the accompanying drawings,—Figure 1 is a side elevation of a clutch operating mechanism embodying the present improvements, certain of the correlated parts being shown more or less diagrammatically. Fig. 2 is a plan view of the mechanism shown in Fig. 1, but omitting the foot lever and its associated parts including the brake mechanism. Fig. 3 is a view corresponding to Fig. 1, but with the clutch members, driving shaft and shifting ring in section. Fig. 4 is a view substantially corresponding to Fig. 1, but with the clutch members in released position. Figs. 5 and 6 are transverse sections, substantially on the lines 5—5 and 6—6, Fig. 3. Fig. 7 is a section at right angles to the section of Fig. 4, and showing the universal joint connection between the clutch members and operating devices. Fig. 8 is a vertical section substantially in the plane indicated by the line 8—8 of Fig. 7, but omitting some of the parts. Fig. 9 is a detail perspective view of the inner end of the clutch rod showing the eccentric and its bearing.

Like letters of reference in the several figures indicate the same parts.

The mechanism constituting the present invention is illustrated in a conventional arrangement for an automobile or self-propelled vehicles. A portion of the engine or motor is indicated at A, its fly wheel at B, the Cardan shaft at C, and the universal joint between the inner end of the Cardan shaft and drive shaft at D. The drive shaft, which constitutes a prolongation of the crank shaft, is indicated at E, and it will be understood that it is connected with the crank shaft at the fly wheel end of the motor or at the opposite end as found most convenient or in fact it may be an integral portion of the motor shaft, or receive the power in any suitable way. In order that the drive shaft may properly support and carry certain parts of the mechanism for operating the clutch, it is preferably of relatively large diameter, and is recessed at O for the accommodation of parts to be presently described. The clutch members are located at the rear end of the shaft and while they may be of any ordinary type adapted to be operated by a longitudinally movable draft rod, they are preferably of the multiple disk type, and as shown in the drawings, disks F are mounted to slide longitudinally on the shaft but to rotate in unison therewith, and clamp between them a disk G also mounted to move longitudinally of the shaft, but capable of rotation independently thereof.

Between a suitable collar or abutment H on the shaft and the disks referred to, there is a yoke or head I with which the disk G is connected for rotation, but said parts are capable of moving longitudinally with relation to each other in the well understood manner, the said head I being the driven part with which the Cardan shaft C is connected, and is adapted to be rotated from the drive shaft when the disks are clamped together.

For clamping the disks together the drive shaft is bored axially for the reception of an adjustable draft rod K the rear end of which is provided with a head $k$ and between said head and the rear disk F there is interposed a universal joint formed by members $k'$ and $k^2$ jointed together on a transverse axis, and member $k^2$ is provided with transverse journals $k^3$ at right angles to the axis of the joint between the members $k'$ and $k^2$, for seating in suitable bearings on the rear disk F. The forward end of the adjustable draft rod K is provided with a head L having a bearing therein for a lever in the form of an eccentric L' journaled on a transverse axis in the drive shaft and having an operating extension M. The pivotal bearings for the lever L' M are formed by the lower ends of recesses indicated in dotted lines at N in the side walls of the chamber O in the drive shaft in which the lever and head of the draft rod are located. Said recesses N are arranged at an inclination with respect to the longitudinal axis of the drive shaft in a direction opposite that of the strain on the pintles $l$ which seat in the bearings formed by the recesses. This construction provides a convenient arrangement whereby the parts may be assembled, but it will be understood that it is a constructive feature only, and the construction may be other than illustrated and described, without departing from the present invention.

As another convenient detail of construction, the head L of the draft rod may be in the form of a yoke, between the arms of which a block L² is adapted to be held by pins or projections $l^2$ adapted to seat in diagonally arranged or inclined recesses $l^3$ in the arms of the yoke, as shown clearly in Fig. 9 of the drawings, but this detail of construction, it is obvious, may be varied and any of the well known arrangements of connecting rod bearings substituted therefor.

The lever L' M constitutes the operating member for the clutch, and if the lever be swung in one direction the eccentric portion thereof will draw the draft rod forwardly and clamp the clutch members together, and if it be swung in the opposite direction, the clutch members will be released. The part M of the operating lever is provided with a track or way for the spring pressed movable member of a sliding carriage which is movable longitudinally of the drive shaft and free to rotate in unison therewith. The sliding carriage embodies in the form illustrated, a ring or annular part P extending around the drive shaft, and within it there is pivotally mounted a pressure lever Q having on one end an antifriction roller $q$ which bears on and travels in the track in the portion M of the operating lever. From Figs. 3 and 4 it will be understood that the pressure member in its travel longitudinally of the drive shaft may bear on the operating lever at a point directly opposite the axis of the lever or slightly in rear thereof, or at any point forward of said axis to the extreme end of the lever, as shown in Fig. 3, and if said pressure member be springpressed, the spring or springs for holding the same in engagement with and moving the operating lever becomes the clutch spring of the device.

In the preferred arrangement the pressure member is advanced to operate the said lever by two springs R interposed between lateral extensions of the pressure member or lever Q and suitable brackets $p$ on the carriage P, and the said carriage is properly supported on the drive shaft against the pressure of said springs exerted through the pressure lever Q by anti-friction rollers P' journaled in the carriage and traveling in a way or ways $e$ on the opposite side of the drive shaft from the pressure member or lever.

The axis and bearing roller $q$ of the pressure member are preferably both located in planes transverse to the drive shaft intermediate the transverse planes in which the rollers P' are located, with the result that the carriage is held in its proper position with relation to the drive shaft and may be moved longitudinally thereon. In the preferred arrangement, the surface of the portion M of the operating lever with which the pressure member engages may be moved to incline in opposite directions with relation to the longitudinal axis of the drive shaft; thus, when the clutch members are separated or released as shown in Fig. 4, the said surface is inclined upwardly toward the forward end of the shaft, and when the carriage is moved to swing the lever so as to grip the clutch members together, it is inclined in the opposite direction, as shown in Fig. 3 of the drawings. Because of this arrangement the clutch spring tends to hold the operating lever in either position to which it may have been moved, and while the inclination in either direction is very slight, yet the tendency of the spring is to cause the carriage either to remain at rest or to travel forwardly in the direction in which the lever member is inclined. Very little power is required to move the carriage in the opposite direction, or against the inclination of the lever member, because the incline which acts as a wedge against the tension of the clutch spring is very slight.

Owing to the ease of movement of the carriage, it is obvious that the application of the clutch or the gripping action of the clutch members may be most accurately controlled and regulated by the employment of comparatively simple shifting mechanism for the carriage. The means preferably employed for shifting the carriage embodies a rock shaft S from which depends a yoke S' pivotally connected at its ends with a shifting ring S² working in a groove s in the carriage P before referred to. The shifting ring S² is provided with a vertically elongated opening, whereby it may have a limited play transversely of the axis of the shaft to accommodate itself to the longitudinal movements of the carriage. At one end the rock shaft is provided with a crank S³, and the rocking movements of the shaft are controlled by a yoke lever T which may conveniently form the foot lever of the control mechanism. The lever T is provided with a channel or slot for the reception of the crank S³ which latter may have an ordinary antifriction roller thereon, and the said channel is partly tangential to the axis of the lever and partly substantially concentric therewith. The tangential portion of the channel in the lever T is indicated at $t$, while the concentric portion is indicated at $t'$. In operation the rock shaft is moved and the carriage shifted to throw the clutch in or out when the crank S³ is in the tangential portion of the channel, as indicated in Figs. 1 and 3, but during the movement of the lever T, after the clutch members have been disengaged as shown in Fig. 4, the crank rests in the concentric portion of the channel and receives no further movement.

The movement of the lever T while the crank is in the concentric portion of the channel is, in so far as the clutch mechanism is concerned, a lost or idle movement, but is is designed in the present mechanism to utilize this portion of the movement for completing the application of the brakes to the vehicle, which result is accomplished by connecting the brakes to the lever T as, for example, by the link U, lever U' and link U². In Fig. 2 the brake band is indicated at U³ and its operating bell crank which is of the usual type, is indicated at U⁴, the arrangement being such that the brake band U³ is tightened when the lever T is pushed forwardly or to the right in Fig. 1.

As before stated, the lever T is illustrated as one designed for use as a foot lever in an automobile or self-propelled vehicle, and for the convenient application of the foot thereto it is provided with a treadle section V designed to normally occupy an inclination which is the most natural inclination for the foot of the user, that is to say, it is substantially 45° to the horizon, and in order to maintain this angle or to permit it to increase slightly as the lever is pushed away from the user, the treadle piece is provided with a curved extension V', having teeth or serrations in its under surface for coöperation with a fixed retaining tooth V². It is obvious that by a slight inclination or tilting of the foot pressing against the treadle piece V the curved member may be thrown into or out of engagement with the fixed retaining tooth and the clutch locked in any position desired or released when it is desired to move it from one position to another. In the preferred construction a relatively light spring W is employed for returning the lever T to its rearward position, the strength of the spring being sufficient to shift the carriage from the position shown in Fig. 4 with the clutch members disengaged to the position shown in Figs. 1 and 3 with the clutch members engaged, and the resistance of this comparatively light spring is all that has to be overcome by the operator in releasing the clutch and in the application of the brake after the clutch is released. In other words, with the present arrangement, the power of the clutch spring which must be comparatively strong, does not have to be directly overcome by the pressure of the operator in moving the clutch members to disengaged position, and in the application of the brakes a defect common to all prior arrangements so far as at present known to me.

In the use of the clutch it is only necessary for the operator to release the ratchet or retaining bar from the fixed tooth and allow the lever T to swing rearwardly under the influence of its comparatively light spring until the desired pressure between the clutch members is secured. This pressure may be most accurately controlled and regulated by the movement of the foot, so that the clutch members will pick up gradually and without imposing a sudden load on the engine by reason of the static inertia of the driven parts. It thus becomes possible to start the vehicle on high gear for the driving members of the clutch may be permitted to slip with a gradually increasing resistance until the driven members are in motion.

By the provision of a shifting connection between the clutch spring and its operating lever the effective power of the spring on the operating lever is gradually increased as the clutch members are brought together. The increasing leverage effect will be readily appreciated when it is remembered that the application of the pressure of the clutch spring to the operating lever shifts from a point where it is practically neutral or negative, as shown in Fig. 4, forwardly toward the free end of the lever; or, to express it in another way, the length of the operative or power arm of the lever is gradually increased by the shifting of the point of application of the power away from the axis of the lever.

Having thus described my invention, what I claim as new and desire to secure by Letters Patent of the United States, is:

1. In a clutch operating mechanism, the combination with the driving and driven clutch members, of an operating lever for bringing the clutch members together having a slide-way thereon, a spring-pressed pressure member coöperating with said slide-way to operate the lever, and means for moving the pressure member longitudinally of the lever to vary the effective length of the lever.

2. In a clutch operating mechanism, the combination with the driving and driven clutch members, of an operating lever for bringing the members together, a movable pressure member coöperating with said lever to operate the same, a clutch spring coöperating with the pressure member, and means for shifting the pressure member longitudinally of the operating lever.

3. In a clutch operating mechanism, the combination with the driving and driven clutch members, of an operating lever for bringing the clutch members together, a pivotally supported pressure member coöperating with the said lever, a clutch spring for holding the pressure member in operative engagement with the lever, and means for shifting the pressure member and its spring longitudinally of the operating lever, whereby the effective length of the lever may be varied.

4. In a clutch operating mechanism, the combination with the driving and driven clutch members, of an operating lever for bringing the clutch members together, a spring-pressed pressure member coöperating with said lever for operating the same, a carriage in which said pressure member is mounted, and means for shifting said carriage and pressure member longitudinally of the operating lever.

5. In a clutch operating mechanism, the combination with the drive shaft and clutch members movable into and out of engagement longitudinally of said shaft, of an operating lever pivotally mounted in the driving shaft and extending longitudinally thereof for operating the clutch member, a spring-pressed pressure member movably engaging the operating lever, a carriage in which said pressure member is mounted movable longitudinally of the drive shaft, and means for moving said carriage and pressure member for varying the effective length of the operating lever.

6. In a clutch operating mechanism, the combination with the shaft and driving and driven clutch members movable into and out of engagement longtiudinally of said shaft, of an operating lever pivotally mounted in the shaft and extending longitudinally thereof, operating connections intermediate said lever and clutch members, a carriage mounted to rotate in unison with the shaft but movable longitudinally thereof, a spring-pressed pressure member mounted in the carriage and movably engaging the operating lever, and means for shifting the carriage to vary the point of engagement between the operating lever and pressure member.

7. In a clutch operating mechanism, the combination with the shaft and clutch members movable into and out of engagement longitudinally of the shaft, of an operating lever pivotally mounted on the shaft and in operative engagement with the clutch members, said operating lever being provided with a way arranged longitudinally of the shaft, a carriage mounted to rotate in unison with but movable longitudinally of the shaft, a pressure member pivotally mounted on the carriage and engaging the way on the lever, and means for moving said carriage.

8. In a clutch operating mechanism, the combination with the shaft and clutch members movable into and out of engagement longitudinally of the shaft, of the operating lever pivotally mounted in the shaft and extending longitudinally thereof, operating connections intermediate said lever and clutch members, a spring-pressed pressure member coöperating with the operating lever, a carriage movable longitudinally of the shaft and in which the pressure member is mounted, a shifting ring connected with said carriage, and means coöperating with said ring for shifting the carriage to vary the point of engagement between the pressure member and operating lever.

9. In a clutch operating mechanism, the combination with the shaft and clutch members movable into and out of engagement longitudinally of said shaft, an operating lever pivotally mounted in the shaft, a connection extending axially of the shaft between said clutch members and lever, a carriage mounted to move longitudinally on the shaft, a pressure member pivotally mounted in the carriage and coöperating with the lever, a clutch spring for advancing the pressure member into engagement with and operating the said lever, and means for shifting the carriage longitudinally of the shaft.

10. In a clutch operating mechanism, the combination with the shaft, clutch members movable longitudinally of the shaft into and out of operative engagement, an operating lever pivotally mounted in the shaft, a pressure member movable longitudinally of the shaft and coöperating with the operating lever, a connection extending axially of the shaft intermediate the lever and clutch members, and a universal joint connection intermediate said connection and clutch members whereby the contacting faces of the clutch members may adjust themselves to each other.

11. In a clutch operating mechanism, the combination with the shaft, clutch members movable longitudinally of the shaft into and out of operative engagement, operative connections extending axially from the clutch members into the shaft and operating lever pivotally mounted in the shaft and coöperating with said axial clutch operating connections, of a carriage movable longitudinally of the shaft, a spring-pressed pressure member mounted in the carriage and coöperating with the lever to swing the same on its axis, and means for shifting the carriage longitudinally.

12. In a clutch operating mechanism, the combination with the shaft, clutch members movable longitudinally of the shaft into and out of operative engagement, operating lever pivotally mounted in the shaft and extending longitudinally thereof, and an operating connection intermediate said lever and clutch members, of means for operating the lever embodying a carriage mounted to rotate in unison but movable longitudinally independently of the shaft, a pressure member mounted in the carriage and bearing on the lever, a shifting ring on the carriage, and a yoke coöperating with said shifting ring for moving the carriage longitudinally of the shaft and operating lever.

13. In a clutch operating mechanism, the combination with the shaft and clutch members movable longitudinally of the shaft into and out of operative engagement, of an operating lever for the clutch members pivotally mounted in the shaft and movable into positions inclined in opposite directions with relation to the axis of the shaft, and means for operating said lever embodying a longitudinally movable spring-pressed pressure member with means for moving said pressure member longitudinally of the lever, whereby the lever will be inclined in one direction when the clutch members are disengaged and inclined in the opposite direction when the clutch members are in engaged position.

14. In a clutch operating mechanism, the combination with the shaft, clutch members movable longitudinally of the shaft into and out of operative engagement and operating lever for said clutch members pivotally mounted in the shaft and having a slide way thereon extending longitudinally of the shaft but adapted to be inclined in opposite directions with relation to the axis of the shaft, of a carriage mounted to rotate in unison with but movable longitudinally of the shaft, a spring-pressed pressure member coöperating with the way on the lever, and means for moving the carriage to vary the point of application of pressure to the said lever.

15. In a clutch operating mechanism, the combination with a shaft, clutch members, an operating lever for moving said clutch members into operative engagement, said lever being pivotally mounted in the shaft to rotate in unison therewith and having a longitudinally extending way thereon, of a spring-pressed pressure member coöperating with said way to move the operating lever, and means for bodily shifting said pressure member longitudinally of the shaft to vary the effective leverage of the lever.

16. In a clutch operating mechanism, the combination with the shaft, clutch members, operating lever pivotally mounted in the shaft and extending longitudinally thereof, spring-pressed pressure member movable longitudinally of the shaft and coöperating with the lever for moving the clutch members into operative engagement, and carriage in which said pressure member is mounted, of means for moving said carriage embodying a yoke and rock shaft, having a crank thereon and a lever having a cam slot coöperating with said crank, said slot being in part tangential to the axis of the lever and in part concentric therewith.

17. In a clutch mechanism for self-propelled vehicles, the combination with the shaft, clutch members, operating lever for said clutch members pivotally mounted in the shaft, spring pressed pressure member coöperating with the operating lever, carriage in which said pressure member is mounted movable longitudinally of the shaft, rock shaft and yoke for shifting said carriage, and crank arm on said rock shaft, of a foot lever coöperating with said crank
5 arm, a treadle pivotally mounted on said foot lever, a curved and toothed locking projection on said treadle and a fixed tooth with which said locking projection coöperates.

CHAS. B. GARDNER.

Witnesses:
R. FRANK TAYLOR,
W. HENEKCLIFFE.